(12) United States Patent
Sekiya et al.

(10) Patent No.: US 6,675,669 B2
(45) Date of Patent: *Jan. 13, 2004

(54) BALL SCREW APPARATUS

(75) Inventors: Noriaki Sekiya, Maebashi (JP);
Daisuke Maruyama, Maebashi (JP);
Toshiyuki Iehisa, Maebashi (JP);
Kazuo Miyaguchi, Maebashi (JP)

(73) Assignee: NSK Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/932,078

(22) Filed: Aug. 17, 2001

(65) Prior Publication Data

US 2002/0023513 A1 Feb. 28, 2002

(30) Foreign Application Priority Data

Aug. 23, 2000 (JP) .......................... 2000-252602

(51) Int. Cl.⁷ .............................................. F16H 25/22
(52) U.S. Cl. ...................................................... 74/424.87
(58) Field of Search .......................... 74/424.86, 424.87, 74/424.82, 424.83, 424.84, 424.85, 424.88

(56) References Cited

U.S. PATENT DOCUMENTS

| | | | | |
|---|---|---|---|---|
| 3,580,098 A | * | 5/1971 | Goad | 74/424.87 |
| 3,815,435 A | * | 6/1974 | Eschenbacher et al. | 74/424.87 |
| 3,971,264 A | * | 7/1976 | Detraz et al. | 74/424.87 |
| 5,005,436 A | * | 4/1991 | Brusasco | 74/424.87 |
| 5,303,607 A | * | 4/1994 | Katahira | 74/424.87 |
| 5,653,145 A | | 8/1997 | Kobayashi et al. | |
| 6,282,972 B2 | | 9/2001 | Kuramochi et al. | |
| 6,450,055 B1 | * | 9/2002 | Sekiya et al. | 74/424.87 |

FOREIGN PATENT DOCUMENTS

JP    63-6504    2/1998

OTHER PUBLICATIONS

U.S. patent application Ser. No. 09/653,072, Sekiya et al., filed Aug. 31, 2000.

* cited by examiner

Primary Examiner—David A. Bucci
Assistant Examiner—Julie K. Smith
(74) Attorney, Agent, or Firm—Christensen O'Connor Johnson Kindness PLLC

(57) ABSTRACT

A ball screw apparatus is provided with a screw shaft having a spiral ball screw groove, a nut member having a screw groove, and a plurality of balls. A smoothly continuous worked portion is formed at a portion of the screw groove by grinding a corner portion between the screw groove and a connecting way. The worked portion is formed such that the distance between the screw grooves is gradually reduced regarding an advancing direction of the ball entering from the connecting way in between the screw grooves. This worked portion extends from an end of the connecting way in a circumferential direction of the nut member and within a range of 90° from the corner portion along the circumferential direction of the nut member.

5 Claims, 6 Drawing Sheets

BALL SCREW APPARATUS

CROSS-REFERENCE TO RELATED APPLICATIONS

This application is based upon and claims the benefit of priority from the prior Japanese Patent Application No. 2000-252602, filed Aug. 23, 2000, the entire contents of which are incorporated herein by reference.

BACKGROUND OF THE INVENTION

1. Field of the Invention

The present invention relates to a ball screw apparatus used in a feed mechanism for various equipments or the like.

2. Description of the Related Art

A ball screw apparatus is a mechanical element which can convert rotation movement to linear movement. The ball screw apparatus comprises a screw shaft formed on its outer circumferential face with a spiral ball screw groove, and a nut member fitted on the outer circumferential face of this screw shaft. A ball screw groove opposed to the ball screw groove of the screw shaft is formed on an inner circumferential face of the nut member.

A spiral ball rolling contact way is constituted by the ball screw groove of the screw shaft and the ball screw groove of the nut member opposed to each other. One portion and another portion of the ball rolling contact way which are spaced from each other are connected to each other by a connecting way provided on the nut member. An endless ball circulating way is constituted by the ball rolling contact way and the connecting way. Many balls are received in the ball circulating way in an endless continuous manner.

The nut member is rotatable relative to the screw shaft. For example, when the screw shaft is rotated relative to the nut member, the respective balls positioned between the screw shaft and the nut member circulate in the ball circulating way in an endless manner while they are rotating. Thus, the balls are circulated in the circulating way in the endless manner according to rotation of the screw shaft, so that the nut member can be moved accurately and smoothly relative to the screw shaft in an axial direction of the screw shaft.

FIG. 7 is a cross-sectional view schematically showing a conventional ball screw apparatus 100 of a tube type. A nut member 2 is fitted on an outer circumferential face of a screw shaft 1. A spiral ball screw groove 1a is formed on an outer circumferential face of the screw shaft 1. A ball screw groove 2a is formed on an outer circumferential face of the nut member 2. The ball screw groove 2a is opposed to the ball screw groove 1a of the screw shaft 1. These ball screw grooves 1a and 2a constitute a spiral ball circulating way 3.

Through holes 4a and 4b are formed on a circumferential wall of the nut member 2. These through holes 4a and 4b are connected to each other by a tube 5. The tube 5 is disposed on an outer circumferential portion of the nut member 2. Both end portions of the tube 5 are inserted into the through holes 4a and 4b. A connection way 6 is constituted by the through holes 4a, 4b and the tube 5. The connecting way 6 connects a portion and another portion of the ball rolling contact way 3 spaced from each other.

Thus, both ends of the ball rolling contact way 3 communicates with each other through the connecting way 6 so that an endless ball circulating way 7 is constituted. Many balls 8 are received in the ball circulating way 7. These balls 8 are arranged in the circulating way 7 in an endless manner.

Each ball 8 is formed from material selected from steel, ceramic, plastic or the like. The balls 8 are circulated in an endless manner while they are rolling in the circulating way 7 as the screw shaft 1 is rotated.

When the nut member 2 is rotated relative to the screw shaft 1, for example, in a direction indicated with arrow R shown in FIG. 7, each ball 8 is rolled in a direction of arrow R along the screw groove 1a. The moving speed of the ball 8 is slower than the rotating speed of the nut member 2. Therefore, each ball 8 moves relatively in a direction opposed to the arrow R towards the screw groove 2a of the nut member 2 through one through hole 4a from the tube 5.

The conventional ball screw apparatus 100 has a corner portion 10 at a connecting portion between the rolling contact way 3 and the connecting way 6, namely a boundary portion between the screw groove 2a and the connecting way 6, as shown in FIG. 7. For this reason, in the conventional ball screw apparatus 100, there is a case that a smooth circulating movement of the ball 8 circulating in the circulating way 7 is prevented by the corner portion 10, which results in deterioration in operability or durability of the ball screw apparatus 100.

When an external load acts on the ball screw apparatus 100, such a state occurs that a distance between the screw grooves 1a and 2a is reduced or shortened. The reason that the distance between the screw grooves 1a and 2a is because of Hertz's contact between one screw groove 1a and the ball 8, Hertz's contact between the other screw groove 2a and the ball 8, and the elastic deformation of the ball 8 itself. In the specification, the state where the distance between the screw grooves 1a and 2a is shortened is referred to as "elastic approach".

In the state where the elastic approach occurs, the ball 8 enters from the tube 5 which is a non-loaded zone in between the screw grooves 1a and 2a where is a loaded zone. Here, when the elastic approach occurs, the ball 8 can not enter in between the screw grooves 1a and 2a by its own force. For this reason, a proceeding ball 8 enters in between the screw grooves 1a and 2a due to pushing of the following ball 8.

Conventionally, the ball screw groove 2a is processed continuously over the entire inner circumference of the nut member 2 on the basis of a diameter of circle passing through the center of each ball 8. For this reason, when the above-mentioned external load acts on the ball screw apparatus 100, the screw grooves 1a and 2a mutually approach to each other over the entire inner circumference of the nut member 2 by the same distance. As a result, as soon as the ball 8 has entered in between the screw grooves 1a and 2a from the tube 5, the ball 8 is compressed rapidly.

For example, in a ball screw apparatus of a diameter of 100 mm, a lead of 25 mm, and a ball diameter of 19.05 mm, when a load is applied thereon, the amount of elastic approach between screw grooves reaches 50 μm in some cases. That is, when the ball enters from a non-loaded zone to a loaded zone, compression of 50 μm occurs. For this reason, when a load is significantly large, there may occur such a problem as described below.

(1) Stress is concentrated on the corner portion 10 between the screw groove 2a and the end of the tube 5 so that flaking occurs thereat.

(2) The ball 8 is easily jammed at the vicinity of the corner portion 10, so that the ball 8 is prevented from circulating smoothly.

(3) When the ball 8 enters from the tube 5 into the screw groove 2a, a preceding ball 8 is pushed by the succeeding ball 8 so that the ball 8 is injured or worn. Powders or particles generated by the wear or abrasion cause lowering of durability of the ball screw apparatus.

BRIEF SUMMARY OF THE INVENTION

The present invention is to provide a screw ball apparatus which allows smooth circulation of balls and which can be improved in durability.

A ball screw apparatus of the present invention comprises:
- a screw shaft formed on its outer cirmuferential face with a spiral ball screw groove;
- a nut member fitted on an outer circumference of the screw shaft and formed on an inner circumferential face with a ball screw groove opposed to the ball screw groove of the screw shaft;
- a ball rolling contact way constituted by the respective ball screw grooves opposed to each other;
- a connecting way provided in the nut member for causing one portion and another portion of the ball rolling contact way to communicate with each other;
- an endless circulating way constituted by the connecting way and the ball rolling contact way; and
- a plurality of balls received in the circulating way, and further comprising a worked portion with a smoothly continuous shape which is formed by grinding a corner portion between the ball rolling contact way and the connecting way.

According to the present invention, balls can circulate smoothly from an initial stage where a ball screw apparatus has just been manufactured. The ball screw apparatus of the present invention has an excellent operability and an enhanced durability. Also, since the balls are facilitated to enter from a non-loaded zone inside the connecting way to a loaded zone between the respective screw grooves, the balls can be prevented from being injured and worn due to contact between the balls.

The worked portion formed by crowning or the like may be formed in a taper shape where the distance between the screw grooves gradually decreases regarding an advancing direction of a ball entering from the connecting way in between the screw grooves. Also, the worked portion may be formed so as to extend from an end of the connecting way in a circumferential direction of the nut member within a range of 90° from the corner portion along the circumferential direction of the nut member. With this constitution, when the ball enters from the connecting way into the ball rolling contact way, the ball is gradually pressed so that concentration of stress is prevented occurring in the ball screw groove. Since, when the worked portion extends from the corner portion beyond the range of 90° therefrom along the circumferential direction of the nut member, the ball screw apparatus is decreased in loading capacity, the worked portion is limited to at most the range of 90° from the corner portion.

It is preferable that the amount of cutting-in in the worked portion is larger than the amount of elastic approach of the ball screw groove. Particularly, regarding the radial direction of the nut member, the cutting-in amount may be set within a range of $1/400$ to $1/10$ of the diameter of the ball. When the cutting-in amount is less than $1/400$ of the ball diameter, the ball is prevented from moving smoothly, which results in failure in solving the above problem. When the cutting-in amount exceeds the $1/10$ of the ball diameter, the operability of the ball screw apparatus deteriorates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will be explained below with reference to FIGS. 1 and 2.

Figure 1:
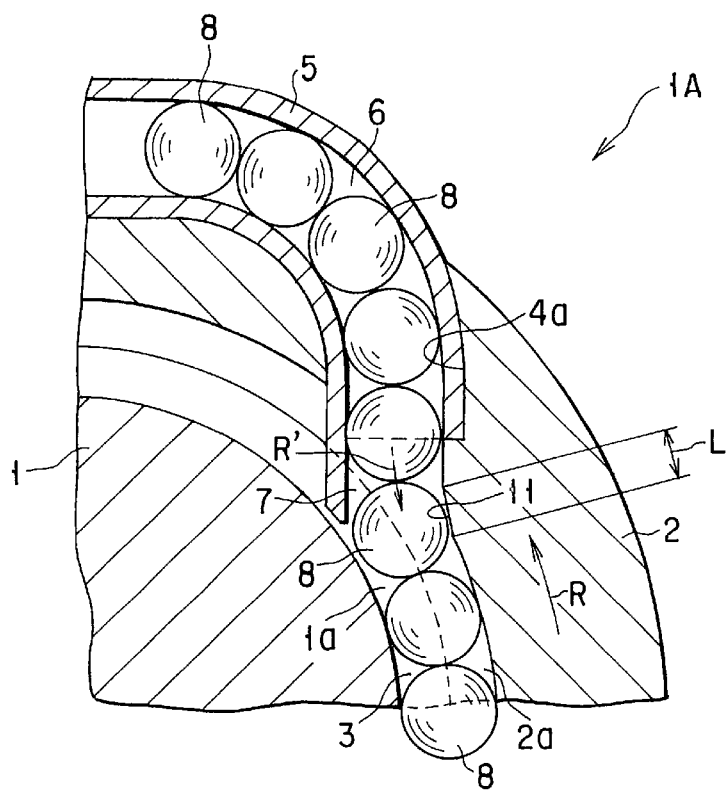
FIG. 1 is a sectional view of a portion of a ball screw apparatus according to a first embodiment of the present invention.
Figure 2:
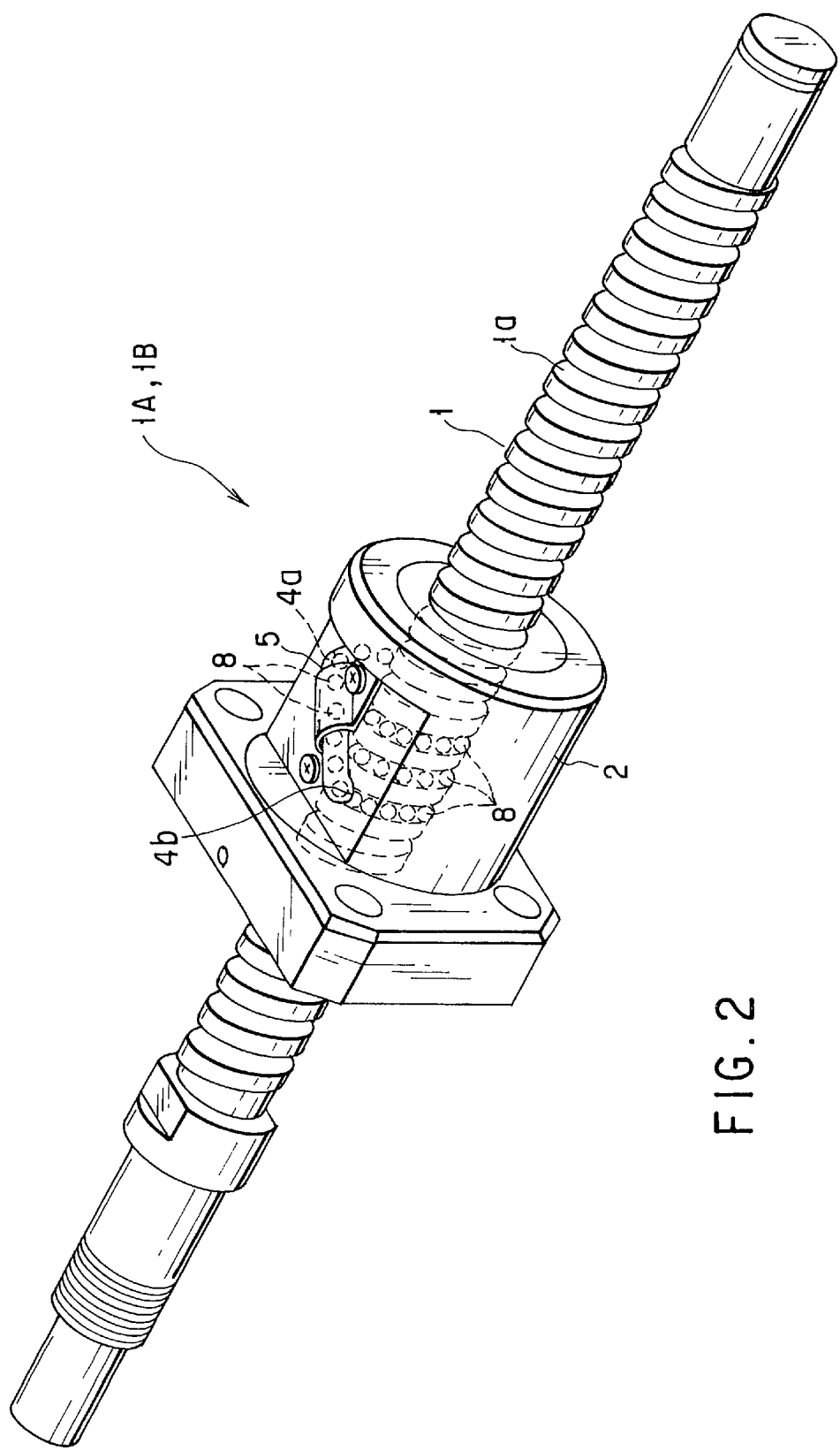
FIG. 2 is a perspective view showing the entire appearance of the ball screw apparatus shown in FIG. 1.

FIG. 1 shows a main portion of a tube type ball screw apparatus 1A according to the first embodiment of the present invention. As shown in FIG. 2, a nut member 2 is fitted on an outer circumference of a screw shaft 1. A spiral ball screw groove 1a is formed on an outer circumferential face of the screw shaft 1. A spiral ball screw groove 2a opposed to the ball screw groove 1a of the screw shaft 1 is formed on an inner circumferential face of the nut member 2. A spiral ball rolling contact way 3 is constituted by the ball screw grooves 1a and 2a opposed to each other.

Through holes 4a and 4b are formed in a circumferential wall of the nut member 2. These through holes 4a and 4b are connected to each other by a tube 5. The tube 5 is arranged on an outer circumferential portion of the nut member 2. Both ends of the tube 5 are respectively inserted into the through holes 4a and 4b. A connecting way 6 is constituted by the through holes 4a, 4b and the tube 5. A portion and another portion of the ball rolling contact-way 3 which are spaced from each other are caused to communicate with each other by the connecting way 6.

The ball rolling contact way 3 is constituted to be continuous in an endless manner by the connecting way 6 so that a ball circulating way 7 is constituted. Many balls 8 are received in the ball circulating way 7. These balls 8 are arranged continuously in an endless manner within the circulating way 7. Each ball 8 is formed from material selected from steel, ceramic, plastic, or the like. These balls 8 circulate in an endless manner while they are rolling within the circulating way 7, when the screw shaft 1 and the nut member 2 are rotated relative to each other.

When the nut member 2 is rotated relative to the screw shaft 1, for example, in a direction shown with arrow R, each ball 8 rolls in the direction of the arrow R along the screw groove 1a. Since the moving speed of the ball 8 is slower than the rotating speed of the nut member 2, each ball 8 moves in a direction of arrow R' from the tube 5 through one through hole 4a towards the screw groove 2a of the nut member 2.

Figure 8:
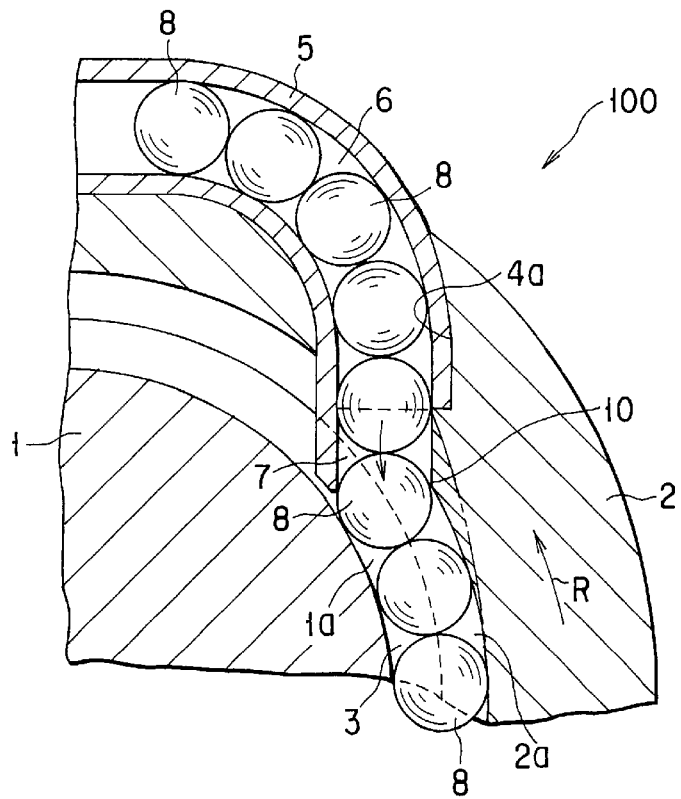
FIG. 8 is a sectional view of a portion of the conventional ball screw apparatus shown in FIG. 7.

The conventional ball screw apparatus 100 shown in FIG. 8 has a corner portion 10 at a connecting portion between the ball rolling contact way 3 and the connecting way 6 just after it has been manufactured. On the other hand, in the ball screw apparatus 1A shown in FIG. 1, a worked portion 11 with a flat and smooth shape is formed by cutting the corner portion 10 in a stage of manufacturing the apparatus. The worked portion 11 is formed by performing chamfering using a grindstone or the like on a boundary portion between the ball screw groove 2a of the nut member 2 and the connecting way 6 over the length L along the circumferential direction of the nut member 2.

In the ball screw apparatus 1A thus constituted, the ball rolling contact way 3 and the connecting way 6 are continuous to each other smoothly. For this reason, the balls 8 can circulate smoothly in the ball circulating way 7 in an initial stage where the ball screw apparatus 1A has just been manufactured. Thereby, wear or abrasion hardly occurs in the balls 8 and the ball circulating way 7 even from an initial stage of operation of the ball screw apparatus 1A, so that operability of the apparatus is maintained in an excellent state and durability thereof is enhanced.

Figure 3:
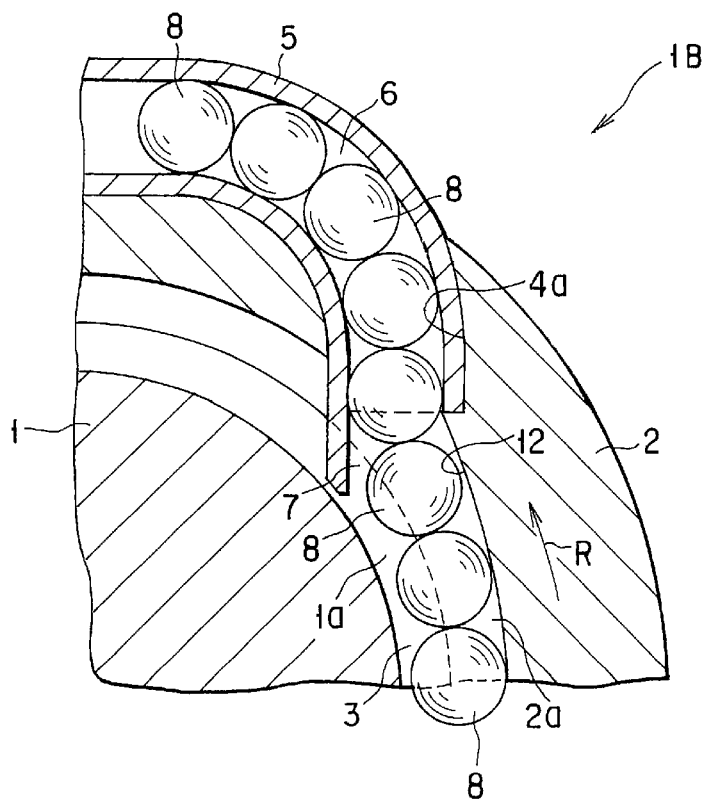
FIG. 3 is a sectional view of a portion of a ball screw apparatus according to a second embodiment of the present invention.
Figure 4:
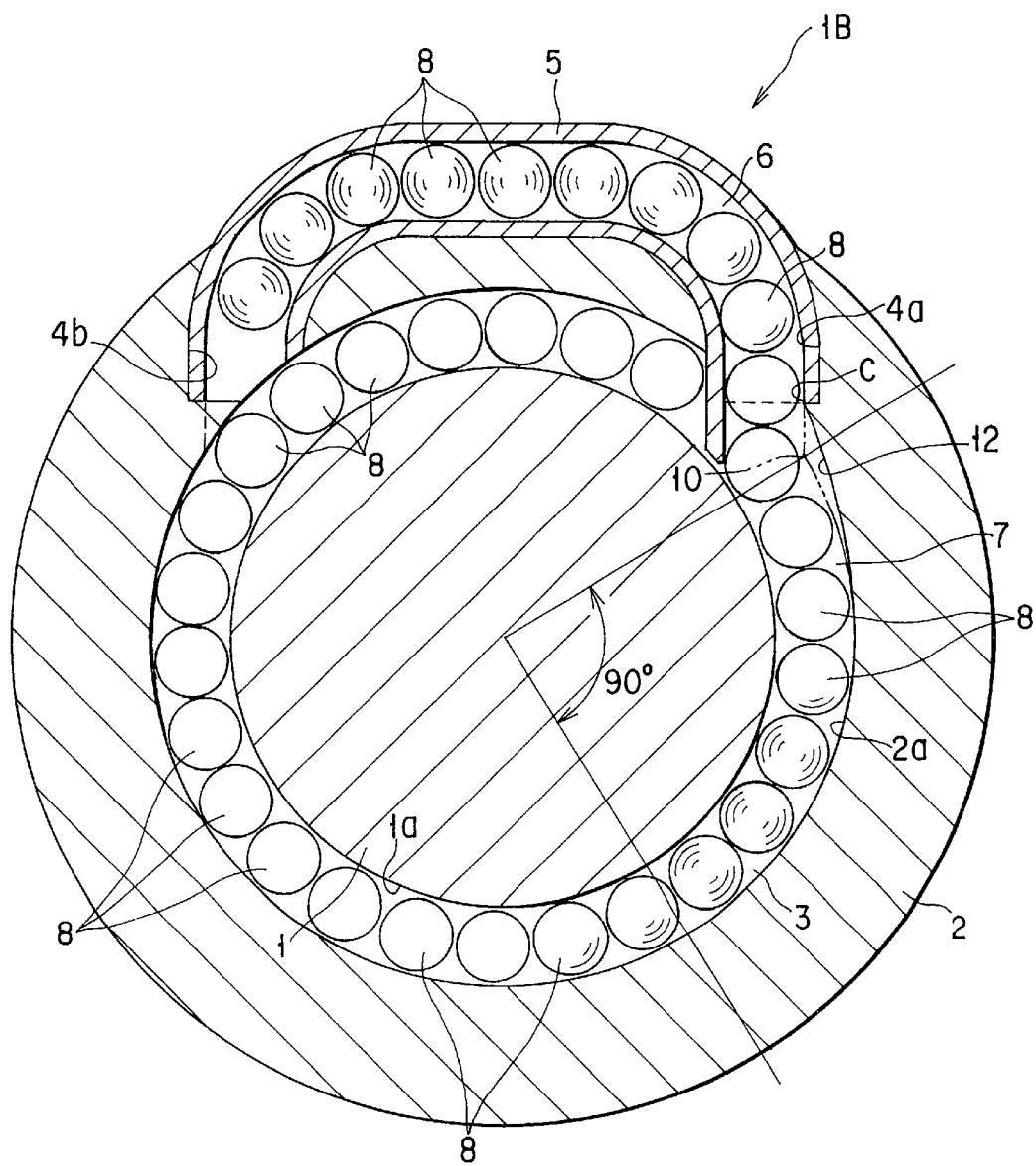
FIG. 4 is a sectional view of the overall ball screw apparatus shown in FIG. 3.
Figure 5:
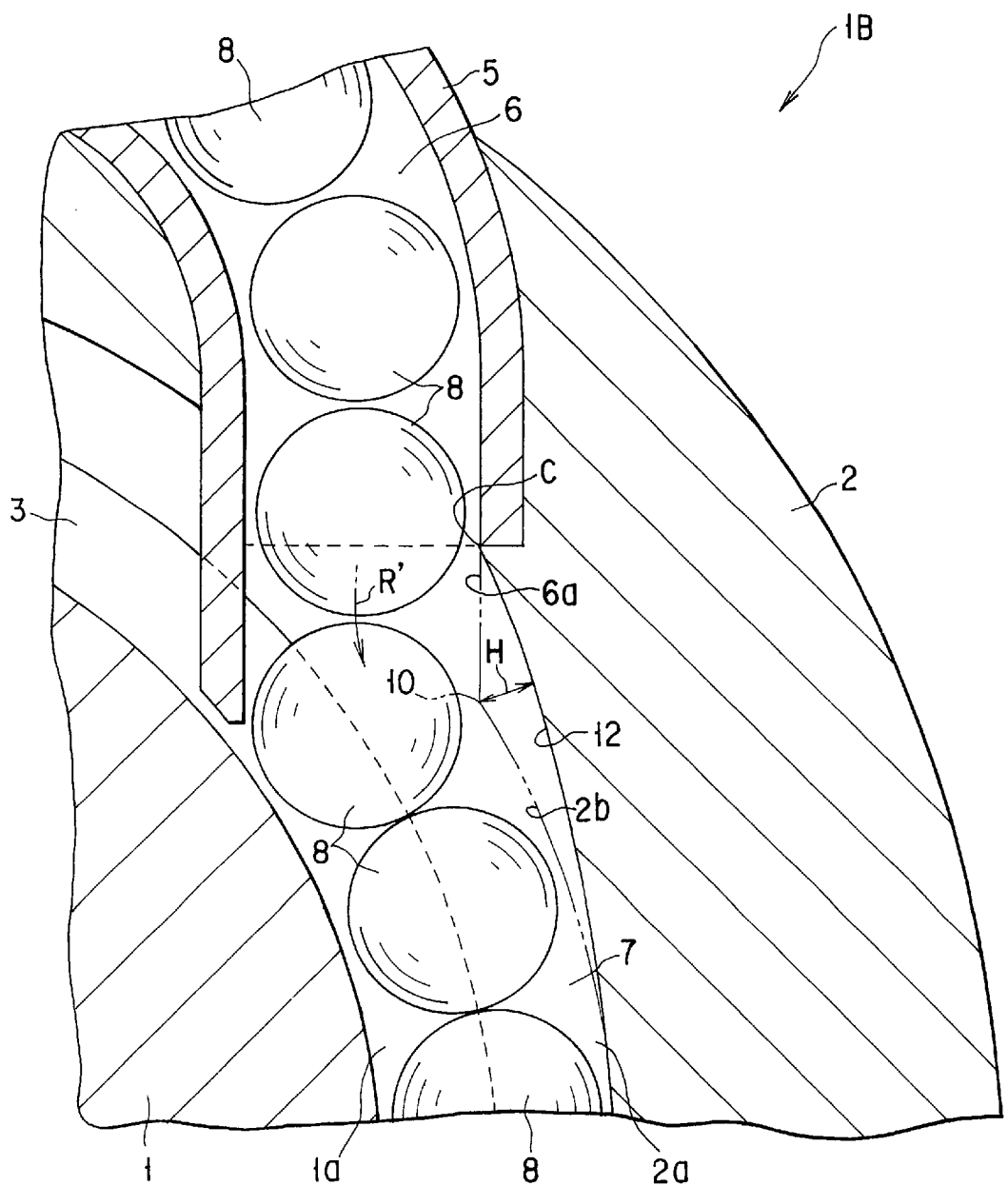
FIG. 5 is a sectional view showing a portion of the ball screw apparatus shown in FIG. 3 in a magnified manner.

A tube type ball screw apparatus 1B according to a second embodiment of the present invention is shown in FIGS. 3 to 5. This ball screw apparatus 1B is similar to the ball screw apparatus 1A of the first embodiment in constituent other than the worked portion 12. Accordingly, regarding the ball screw apparatus 1B, portions thereof common to the ball screw apparatus 1A of the first embodiment will be attached with the common or same reference numerals and explanation thereof will be omitted.

Figure 7:
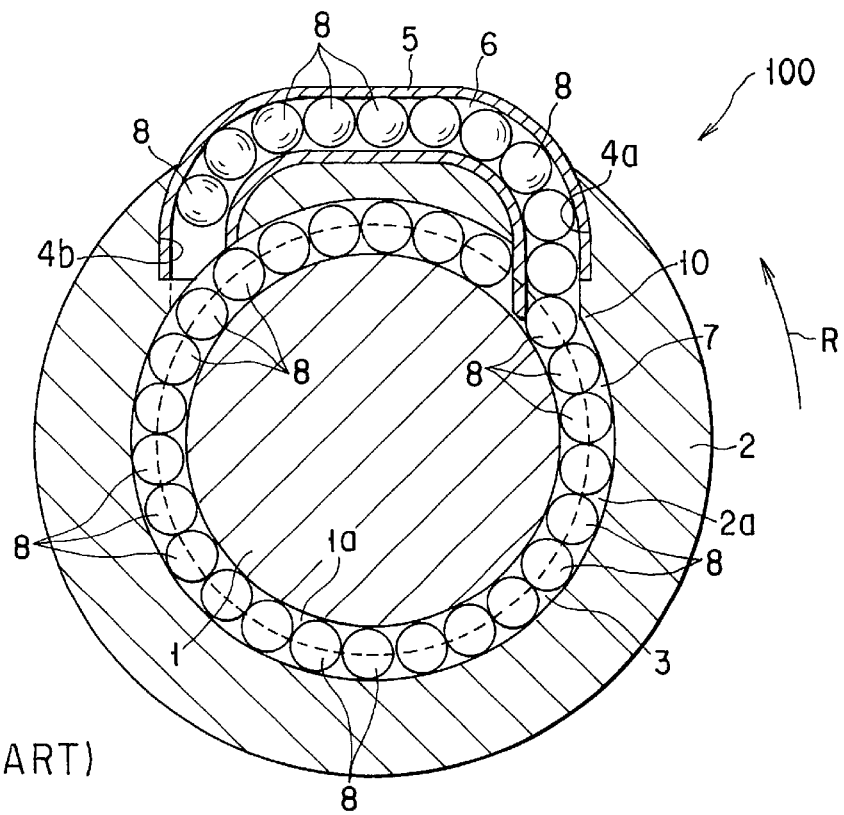
FIG. 7 is a sectional view of a conventional ball screw apparatus.

A gently arc-shaped worked portion 12 is formed on an inner face of a nut member 2 of the ball screw apparatus 1B. This worked portion 12 is processed by crowning where grinding means such as, for example, a grindstone or the like is used. The worked portion 12 is formed by grinding the corner portion 10 formed in the conventional ball screw apparatus 100 (FIG. 7) and a relatively long area including the corner portion 10 in an arc shape by grindstone or the like. As shown in FIG. 5, the corner portion 10 was formed at a intersection where a circle 2b along the ball screw groove 2a of the nut member 2 and an extended segment 6a of the inner surface of the connecting way 6 are crossed each other.

As shown in FIG. 4, the worked portion 12 extends from the end C of the connecting way 6 in a circumferential direction of the nut member 2. This worked portion 12 is formed in a tapered shape where distance between the screw grooves 1a and 2a is gradually decreased regarding an advancing direction (a direction shown with arrow R' in FIG. 5) of the ball 8 entering from the connecting way 6 in between the respective screw grooves 1a and 2a. This worked portion 12 is formed so as to extend from the end C of the connecting way 6 in a circumferential direction of the nut member 2 within a range of 90° from the corner portion 12 along the circumferential direction.

By providing the worked portion 12, the ball 8 is facilitated to enter in between the screw grooves 1a and 2a. In addition, since the ball 8 is gradually pressed according to rolling of the ball 8, stress is prevented from being concentrated on the screw groove 2a. In a case that the length of the worked portion 12 exceeds 90° in the circumferential direction of the nut member 2, the loading capacity of the ball screw apparatus 1B decreases. For this reason, the length of the worked portion 12 is set within at most the range of 90° from the corner portion 10.

The grinding amount (cutting-in amount H shown in FIG. 5) of the worked portion 12 is made larger than the elastic approach amount of the ball screw grooves 1a and 2a due to the aforesaid reason. That is, the cut-in amount H regarding the radial direction of the nut member 2 is set within a range from $\frac{1}{400}$ of the diameter of the ball 8 to $\frac{1}{10}$ thereof.

In the ball screw apparatus 1B of the second embodiment thus constituted, the ball rolling contact way 3 and the connecting way 6 are continuous to each other smoothly. Therefore, each ball 8 circulates smoothly in the circulating way 7 from an initial stage operation of the ball screw apparatus 1B. Accordingly, the ball 8 and the circulating way 7 are prevented from being worn even from the initial stage of operation of the ball screw apparatus 1B so that excellent operability of the apparatus 1B can be attained and durability thereof can be improved.

The present invention is applicable to not only the tube type ball screw apparatus whose connecting way 6 is constituted by the tube 5 but also an internal circulating type ball screw apparatus using parts for a connecting way. Also, the present invention can be applied to a ball screw apparatus where a connecting way is formed on an end cap. Briefly speaking, the ball screw apparatus of the present invention can be provided by forming the smoothly continuous worked portion by grinding or cutting out the corner portion between the connecting way of the nut member and the ball screw groove.

Figure 6:
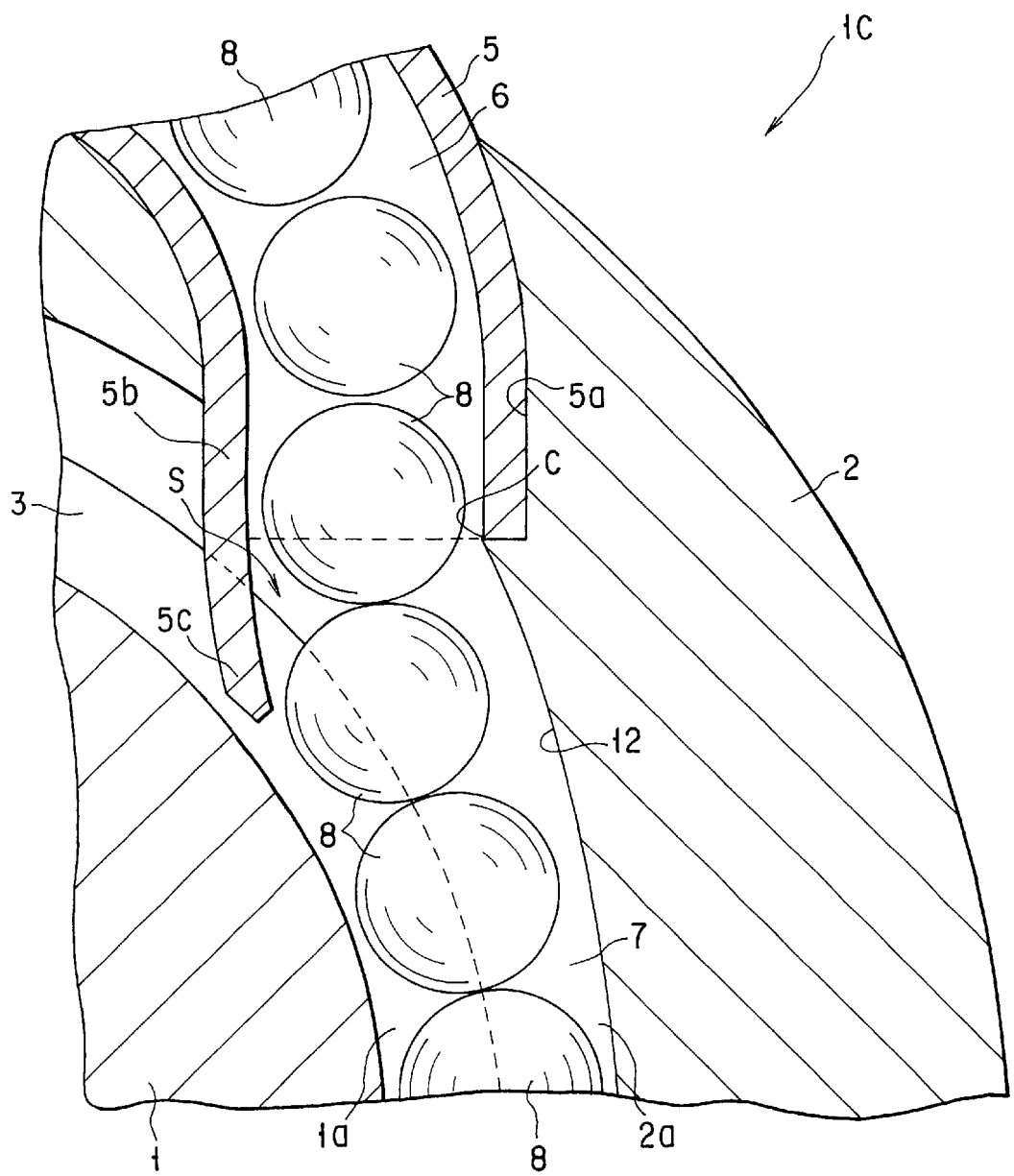
FIG. 6 is a sectional view showing a portion of a ball screw apparatus according to a third embodiment of the present invention.

FIG. 6 shows a ball screw apparatus 1C according to a third embodiment of the present invention. This ball screw apparatus 1C is similar to the ball screw apparatus 1B of the second embodiment in constituent other than the tube 5.

A tube 5 of the ball screw apparatus 1C is provided with an end portion 5b inserted into the hole 5a formed in the nut member 2 and a tongue portion 5c projecting from a portion of the end portion 5b. The tongue portion 5c is opposed to the ball screw groove 2a of the nut member 2. A ball scooping space S is defined by the tongue portion 5c and the ball screw groove 2a. The tongue portion 5c is bent in a direction toward the ball screw groove 2a. The tongue portion 5c with such a shape is provided so that the connecting way 6 and the ball circulating way 7 are connected to each other in a gently curved manner via the ball scooping space S.

When the ball screw apparatus 1C is used, the balls 8 circulate inside the connecting way 6 and the ball circulating way 7. During this circulation, each ball 8 moves between the connecting way 6 and the ball circulating way 7 via the ball scooping space S while rolling. In this embodiment, since the tongue portion 5c is bent in the direction of the ball screw groove 2a, the arrangement of the balls 8 passing through the ball scooping space S is prevented from being disturbed largely. The respective balls 8 moves smoothly between the connecting way 6 and the ball circulating way 7 which they are maintained in an alignment state. Since the tongue portion 5c with such a shape is provided at the end portion of the tube 5, even when a wide worked portion 12 is formed by grinding the corner portion 10 largely, the ball 8 can be moved smoothly.

In addition, since a tip end of the tongue portion 5c is bent in the direction of the ball screw groove 2a, the ball 8 moving from the ball circulating way 7 towards the connecting way 6 is prevented from striking against the tongue portion 5c in the ball scooping space S with a large force. In this ball screw apparatus 1C, even when the balls 8 move at a high speed, they can circulate smooth between the connecting way 6 and the ball circulating way 7. The ball screw apparatus 1C has an excellent operability and an improved durability as compared with a ball screw apparatus where the tongue portion 5c is straight.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A ball screw apparatus comprising:
    a screw shaft whose outer circumferential face is formed with a spiral screw groove;
    a nut member which is fitted on an outer circumference of the screw shaft and whose inner circumferential face is formed with a ball screw groove opposed to the ball screw groove of the screw shaft;
    a ball rolling contact way which is constituted by the respective ball screw grooves opposed to each other;
    a connecting way which is provided in the nut member and which causes one portion and another portion of the ball rolling contact way to communicate with each other;
    an endless circulating way which is constituted by the connecting way and the ball rolling contact way; and
    a plurality of balls received in the circulating way,
    and further comprising a worked portion with a smoothly continuous shape which is formed by grinding a corner portion at a connecting portion between the ball rolling contact way and the connecting way.
2. A ball screw apparatus according to claim 1, wherein the worked portion is formed such that the distance between the screw grooves is reduced gradually regarding an advancing direction of the ball entering from the connecting way in between the respective grooves, and the worked portion is formed so as to extend from an end of the connecting way in a circumferential direction of the nut member within a range of 90° from the corner portion along the circumferential direction of the nut member.
3. A ball screw apparatus according to claim 1, wherein the worked portion is formed such that the distance between the screw grooves is reduced gradually regarding an advancing direction of the ball entering from the connecting way in between the respective grooves, and a cutting-in amount of the worked portion is in a range of $\frac{1}{400}$ of the diameter of the ball to $\frac{1}{10}$ thereof regarding a diametrical direction of the nut member.
4. A ball screw apparatus according to claim 2, wherein a cutting-in amount of the worked portion is in a range of $\frac{1}{400}$ of the diameter of the ball to $\frac{1}{10}$ thereof regarding a diametrical direction of the nut member.
5. A ball screw apparatus according to claim 1, further comprising a tube forming the connecting way, wherein a tongue portion bent in a direction of the ball screw groove of the nut member is formed on an end portion of the tube, and a ball scooping space is formed between the tongue portion and the ball screw groove of the nut member.

* * * * *